US011165110B2

(12) United States Patent
Scharner et al.

(10) Patent No.: US 11,165,110 B2
(45) Date of Patent: Nov. 2, 2021

(54) STORED ELECTRICAL ENERGY SOURCE HAVING COOLING PLATES ARRANGED BETWEEN THE CELLS FOR EMERGENCY COOLING

(71) Applicant: Bayerische Motoren Werke Aktiengesellschaft, Munich (DE)

(72) Inventors: Sebastian Scharner, Tuerkenfeld (DE); Benjamin Weber, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 92 days.

(21) Appl. No.: 16/375,395

(22) Filed: Apr. 4, 2019

(65) Prior Publication Data

US 2019/0229386 A1 Jul. 25, 2019

Related U.S. Application Data

(63) Continuation of application No. PCT/EP2017/072291, filed on Sep. 6, 2017.

(30) Foreign Application Priority Data

Oct. 5, 2016 (DE) ..................... 10 2016 219 283.3

(51) Int. Cl.
*H01M 10/6557* (2014.01)
*H01M 10/613* (2014.01)
(Continued)

(52) U.S. Cl.
CPC ..... *H01M 10/6557* (2015.04); *H01M 10/613* (2015.04); *H01M 10/625* (2015.04);
(Continued)

(58) Field of Classification Search
CPC ......... H01M 10/6557; H01M 10/6567; H01M 10/625; H01M 10/6555; H01M 10/613;
(Continued)

(56) References Cited

U.S. PATENT DOCUMENTS 6,461,757 B1 * 10/2002 Sasayama ........... H01M 2/0275
429/127
2003/0013007 A1 * 1/2003 Kaun .................. H01M 6/5038
429/94

(Continued)

FOREIGN PATENT DOCUMENTS

DE 10 2008 054 656 A1 6/2010
DE 10 2009 040 147 A1 3/2011

(Continued)

OTHER PUBLICATIONS

Persson et al., "Modulus of Elasticity and Its Influence on the Performance of Flapper Valve Materials," International Compressor Engineering Conference, 2008, pp. 1-8. (Year: 2008).*

(Continued)

*Primary Examiner* — Ula C Ruddock
*Assistant Examiner* — Matthew W Van Oudenaren
(74) *Attorney, Agent, or Firm* — Crowell & Moring LLP

(57) ABSTRACT

An energy store has a plurality of electrical energy storage cells, which are connected electrically in series or parallel and are combined to form an energy storage module. Cooling plates are arranged between the energy storage cells and into which coolant or refrigerant can be introduced. Each cooling plate has a support frame, which extends around an elastic insert. The elastic insert forms a channel structure, which guides the coolant or refrigerant through the elastic insert. A method for producing the energy store has the following steps: adhesively bonding a first electrically insulating film to a side of a support frame of a cooling plate; arranging an elastic insert within the support frame, whereby the elastic insert is also adhesively bonded to the first electrically insulating film, and alternately stacking energy storage cells and cooling plates to form an energy storage module.

15 Claims, 5 Drawing Sheets

(51) Int. Cl.
*H01M 10/625* (2014.01)
*H01M 10/6555* (2014.01)
*H01M 10/6567* (2014.01)

(52) U.S. Cl.
CPC ... *H01M 10/6555* (2015.04); *H01M 10/6567* (2015.04); *H01M 2220/20* (2013.01)

(58) Field of Classification Search
CPC .......... H01M 10/653; H01M 10/6552; H01M 2220/20
See application file for complete search history.

(56) References Cited

U.S. PATENT DOCUMENTS

| | | | |
|---|---|---|---|
| 2010/0136391 A1 | 6/2010 | Prilutsky et al. | |
| 2010/0247996 A1* | 9/2010 | Ijaz | H01M 50/502 429/120 |
| 2010/0266883 A1* | 10/2010 | Koetting | H01M 10/625 429/96 |
| 2011/0003185 A1* | 1/2011 | Kritzer | H01M 50/20 429/56 |
| 2011/0223462 A1* | 9/2011 | Kim | H01M 10/6562 429/120 |
| 2011/0274958 A1 | 11/2011 | Iritani et al. | |
| 2012/0237805 A1* | 9/2012 | Abels | H01M 10/613 429/83 |
| 2012/0282506 A1 | 11/2012 | Hohenthanner et al. | |
| 2015/0072194 A1 | 3/2015 | Schmieder et al. | |
| 2015/0104686 A1 | 4/2015 | Brommer et al. | |
| 2015/0221995 A1 | 8/2015 | Robert et al. | |
| 2016/0204483 A1 | 7/2016 | Schilder et al. | |

FOREIGN PATENT DOCUMENTS

| | | |
|---|---|---|
| DE | 10 2011 051 648 A1 | 1/2013 |
| DE | 10 2011 120 511 A1 | 6/2013 |
| DE | 10 2012 200 591 A1 | 7/2013 |
| DE | 10 2012 215 171 A1 | 2/2014 |
| DE | 10 2013 215 082 A1 | 2/2015 |
| DE | 10 2014 112 420 A1 | 3/2015 |
| DE | 10 2015 014 690 A1 | 7/2016 |
| DE | 10 2016 100 120 A1 | 7/2016 |
| DE | 10 2015 202 149 B3 | 8/2016 |
| EP | 0 892 450 A2 | 1/1999 |
| EP | 2 031 672 A1 | 3/2009 |
| EP | 2 284 425 A1 | 2/2011 |
| JP | 2008-251263 A | 10/2008 |
| JP | 2014-82069 A | 5/2014 |
| WO | WO 2011/073426 A1 | 6/2011 |
| WO | WO2011073426 * | 6/2011 |
| WO | WO 2016/128180 A1 | 8/2016 |

OTHER PUBLICATIONS

International Search Report (PCT/ISA/210) issued in PCT Application No. PCT/EP2017/072710 dated Oct. 20, 2017 with English translation (four (4) pages).
German-language Written Opinion (PCT/ISA/237) issued in PCT Application No. PCT/EP2017/072710 dated Oct. 13, 2017 (six (6) pages).
German-language Search Report issued in counterpart German Application No. 102016219286.8 dated May 12, 2017 with partial English translation (13 pages).
International Search Report (PCT/ISA/210) issued in PCT Application No. PCT/EP2017/072708 dated Oct. 19, 2017 with English translation (five (5) pages).
German-language Written Opinion (PCT/ISA/237) issued in PCT Application No. PCT/EP2017/072708 dated Oct. 11, 2017 (four (4) pages).
German-language Search Report issued in counterpart German Application No. 102016219284.1 dated May 19, 2017 with partial English translation (13 pages).
International Search Report (PCT/ISA/210) issued in PCT Application No. PCT/EP2017/072291 dated Nov. 8, 2017 with English translation (four (4) pages).
German-language Written Opinion (PCT/ISA/237) issued in PCT Application No. PCT/EP2017/072291 dated Nov. 8, 2017 (six (6) pages).
German-language Search Report issued in counterpart German Application No. 10 2016 219 283.3 dated May 18, 2017 with partial English translation (14 pages).

* cited by examiner

STORED ELECTRICAL ENERGY SOURCE HAVING COOLING PLATES ARRANGED BETWEEN THE CELLS FOR EMERGENCY COOLING

CROSS REFERENCE TO RELATED APPLICATIONS

This application is a continuation of PCT International Application No. PCT/EP2017/072291, filed Sep. 6, 2017, which claims priority under 35 U.S.C. § 119 from German Patent Application No. 10 2016 219 283.3, filed Oct. 5, 2016, the entire disclosures of which are herein expressly incorporated by reference.

This application contains subject matter related to U.S. application Ser. No. 16/375,020, entitled "Stored Electrical Energy Source Having an Emergency Cooling Device," and Ser. No. 16/374,843, entitled "Electric Energy Store Comprising Energy Storage Cells, the Side Surfaces of which are Provided with a Pattern" filed on Apr. 4, 2019, respectively.

BACKGROUND AND SUMMARY OF THE INVENTION

The invention relates to an energy store consisting of energy storage cells between which cooling plates are arranged that are intended to cool an energy storage cell in an emergency.

Presently, electrical traction energy stores having a high voltage level are predominantly used for electromobility. Such energy stores or high-voltage stores predominantly use lithium-ion stores that have various design possibilities. In the technical field, there is a prevailing tendency to develop lithium-ion cells having an increasingly higher energy density. The thermal stability of many lithium-ion cells however behaves in a manner inversely proportional to the stored amount of energy per unit of volume (energy density). In such high-voltage stores, an energy storage cell that experiences a short circuit internal to the cell may exponentially release heat (a so-called thermal event). However, the amount of heat arising in this process is not enough to likewise excite a thermal event in the adjacent cell: as long as the energy density does not exceed 130-150 Wh/kg and the thermal stability limit is high enough, a thermal event remains restricted to the cell with a short circuit internal to the cell and does not propagate further into the store. In future stores, it is the intention for the energy density of energy storage cells to be increased up to 200 Wh/kg and more. The amount of heat in a thermal event in such an energy storage cell could then be enough to transition to adjacent cells. To prevent this, additional measures have to be provided in the energy store in order to also ensure its safety in these critical situations.

There is therefore a need for safety precautions for future high-voltage stores that will have a higher energy density.

One object of the invention is to provide an energy store that meets higher safety requirements. This object is achieved by an energy store, as well as a motor vehicle having such an energy store, having a plurality of electrical energy storage cells that are electrically connected in series or in parallel and are combined so as to form an energy storage module. Cooling plates are arranged between the energy storage cells and into which coolant or refrigerant is able to be introduced. Each cooling plate has a support frame that surrounds an elastic insert. The elastic insert forms a channel structure that routes the coolant or refrigerant through the elastic insert.

According to one exemplary embodiment of the invention, an energy store is provided, having a plurality of electrical energy storage cells that are electrically connected in series or in parallel and are combined so as to form an energy storage module, and cooling plates, arranged between the energy storage cells and into which coolant or refrigerant is able to be introduced, wherein each cooling plate has a support frame that surrounds an elastic insert. The elastic insert forms a channel structure that routes the coolant or refrigerant through the elastic insert. The advantage of this exemplary embodiment is that the support frame spaces, positions and stabilizes the energy storage cells. The elastic insert inside the support frame allows the energy storage cells to bulge slightly, which arises as the cells age, but in doing so also exerts a certain counterpressure against this bulging. By virtue of the channel structure, the coolant or refrigerant is distributed over the surface of the cooling plate as extensively as possible, so as to have the best possible cooling effect. Thus, in the case of a thermal event, the affected energy storage cells are cooled to the extent that transitioning of the thermal event is prevented or at least significantly delayed.

According to a further exemplary embodiment of the invention, an electrically insulating film is in each case arranged between the elastic insert, including support frame, and the energy storage cells adjoining the cooling plate. These films insulate adjacent energy storage cells from one another and, in some configurations, form the side walls of the cooling plate, which laterally closes off the exposed cooling channel or cooling channels.

According to a further exemplary embodiment of the invention, the elasticity of the elastic insert decreases as the temperature rises above 130° C., in particular above 150° C. This limit temperature serves as the boundary between normal operation and a thermal event. A stiffening, in particular above this limit temperature, has the effect that the elastic insert stiffens and thus provides even more counterpressure against bulging brought about by the thermal event. It is also achieved that the channel structure formed in the elastic insert remains more stable in terms of form in the case of a thermal event.

According to a further exemplary embodiment of the invention, the support frame consists of thermoset polymer (in particular thermoset polymer reinforced with fillers), mica, polytetrafluoroethylene, silicone resin, perfluoroalkoxy polymer, polyimide, refractory foamed ceramic or a combination of a plurality of these materials.

According to a further exemplary embodiment of the invention, the channel structure passes completely through the elastic insert in a thickness direction of the elastic insert, such that the channel structure is exposed on the side faces that face the adjacent energy storage cells. On the exposed sides, the channel structure is then closed off by way of the electrically insulating films. The advantage of this refinement is simple and inexpensive manufacture.

According to a further exemplary embodiment of the invention, the channel structure is formed inside the elastic insert such that the elastic insert is closed off completely on the two side faces that face the adjacent energy storage cells.

According to a further exemplary embodiment of the invention, the channel structure is designed in the form of a meandering channel that extends from an input to an output of the cooling plate.

According to a further exemplary embodiment of the invention, the channel structure is designed in the form of a plurality of channels that extend parallel to one another.

The invention furthermore provides a method for manufacturing an energy store, having the acts of: adhesively bonding a first electrically insulating film to one side of a support frame of a cooling plate; arranging an elastic insert inside the support frame, as a result of which the elastic insert is likewise adhesively bonded to the first electrically insulating film, and alternately stacking energy storage cells and cooling plates so as to form an energy storage module. This method allows simple and inexpensive manufacture of the cooling plates according to the invention.

According to a further exemplary embodiment of the method, the step of attaching a second electrically insulating film between the side of the elastic insert that lies opposite the first electrically insulating film and the adjacent energy storage cell is furthermore provided.

The invention moreover provides a motor vehicle having such an energy store.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
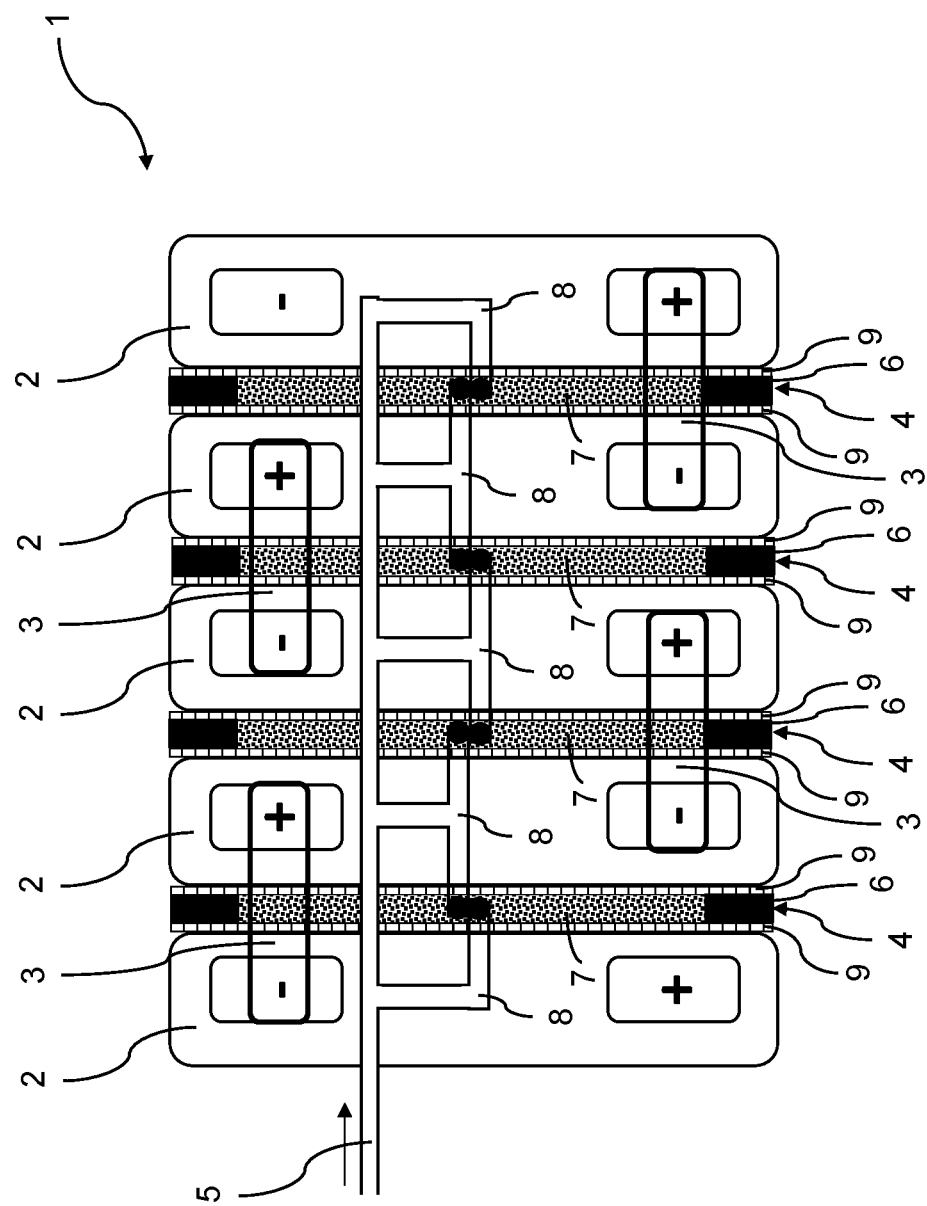
FIG. 1 is a schematic structure of an energy store according to an embodiment of the invention.

FIG. 1 shows a schematic structure of an electrical energy store 1 according to an embodiment of the invention. It comprises a plurality of electrical energy storage cells 2, which are preferably lithium-ion cells. The energy storage cells 2 are preferably what are known as hard-case cells. These are prismatic cells having a torsion-resistant metal housing, in particular made of aluminum. This metal housing is not a composite material, but rather is exclusively metal. The metal housing is closed off using a laser welding method. Pouch cells, in which the cell housing is formed from a foil composite material formed from a plurality of metal and plastic foils applied on top of one another, wherein the layer facing the cell inner side is configured as a heat-sealing layer, that is to say it contains a hotmelt adhesive, are likewise known and contemplated for use with this invention. Two cell housing halves (composite foils) formed in this way are then adhesively bonded to one another and sealed by way of their heat-sealing layer.

The plurality of energy storage cells 2 is combined so as to form an energy storage module, wherein the individual energy storage cells 2 are electrically connected to one another in series or in parallel, preferably in series, as illustrated in FIG. 1, by way of cell connectors 3. The cell connectors 3 are configured as plate-shaped busbars that accordingly connect the poles of the individual energy storage cells 2 to one another. A cooling plate 4 is in each case arranged between each two adjacent energy storage cells 2.

The cooling plates 4 each comprise a support frame 6. An elastic insert 7 is provided inside the support frame 6. The elastic insert 7 preferably consists of a foam material that is resistant to high temperatures. The combined support frame 6 and elastic insert 7 is provided on both sides, that is to say between this combination and the adjacent energy storage cells 2 on both sides, with a respective electrically insulating film 9.

In the case of an emergency cooling requirement (thermal event), coolant is able to be fed directly to one or more coolant lines 8 via a coolant feed line 5. Water, $CO_2$, a fluorinated ketone, a fluorinated ether and/or a hydrofluoroether may be used as the coolant, for example. A specific coolant line 8 guides the coolant into the cooling plate or cooling plates 4 associated with this coolant line 8, as a result of which the energy storage cell 2 associated with the coolant line 8 is cooled. An energy storage cell 2 that is heating exponentially is then able to be cooled down using the non-combustible coolant. An emergency cooling device in this case itself recognizes whether and which cell has to be cooled, a power supply not being necessary. To this end, the coolant lines 8 are provided with valves or emergency closures, not shown, that allow a flow of coolant only above a specific limit temperature, in particular 100 to 130° C., and therefore block a flow of coolant up to this temperature.

A respective single valve or emergency closure is provided per energy storage cell 2, which valve or emergency closure blocks a flow of coolant through the associated coolant line 8 during normal operation of the energy storage cells 2 and allows a flow of coolant when the limit temperature of the associated energy storage cell 2 is exceeded. The coolant lines 8 are connected to the coolant feed line 5 in parallel with one another. The coolant lines 8 lead into one or two cooling plates 4 that bear on the energy storage cell 2 associated with the coolant line 8. More precisely, the two outer energy storage cells 2 of the energy storage module are provided with a cooling plate 4 only on their sides facing toward the center of the energy storage module. Therefore, the coolant lines 8 of the two outer energy storage cells 2 lead directly to these cooling plates 4. The energy storage cells 2 arranged between two energy storage cells 2 (the inner energy storage cells) are provided in each case on both sides with cooling plates 4, wherein two adjacent energy storage cells 2 share the cooling plate 4 situated between them or this cooling plate 4 is associated with both energy storage cells 2. The coolant lines 8 of these inner energy storage cells 2 branch off, wherein a respective branch leads to one of the two cooling plates 4 that bears on the energy storage cell 2 associated with the coolant line 8 in question. Of course, the outer energy storage cells 2 may also be provided with cooling plates 4 on both sides, such that they have the same structure as the inner energy storage cells 2 and are connected to the branched-off coolant lines 8.

If the temperature of an energy storage cell 2 in question now exceeds the limit temperature, then the coolant line 8 associated with this energy storage cell 2 opens by way of the valve or of the emergency closure, such that coolant is able to flow out of the coolant feed line 5 into the cooling plates 4, which bear on the energy storage cell 2 in question, via the coolant line 8, which is now open.

To save weight and structural space, the coolant reservoir is ideally dimensioned for the cooling system of an energy storage cell 2. In this case, each energy storage cell 2 in the energy store 1 is able to be served by the cooling system.

It would also be possible to incorporate the described emergency cooling system into a cooling circuit that is provided for the air conditioning of a vehicle interior or for the cooling of vehicle components (for example for the regular cooling of the energy store). The emergency cooling system may therefore be integrated into an existing store cooling system, that is to say provided in addition thereto, and use the coolant (for example refrigerant) in the existing store cooling system in an emergency.

Figure 2:
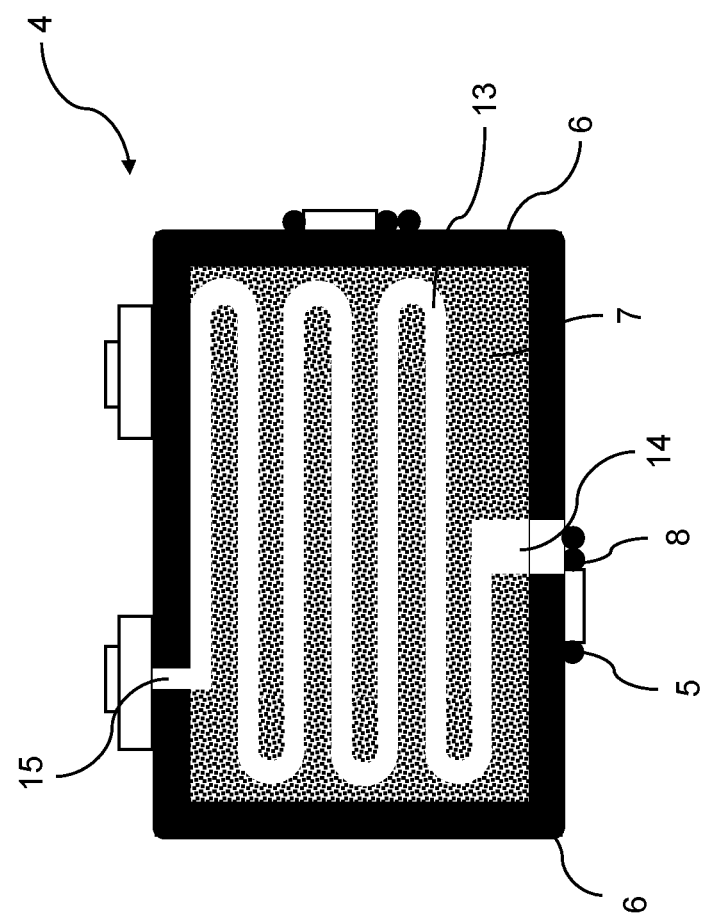
FIG. 2 schematically shows a cooling plate of the energy store according to an embodiment of the invention.

FIG. 2 schematically shows a cooling plate 4 without the films 9. Each cooling plate comprises the support frame 6, which is preferably a rectangular frame that is either configured in one part and therefore has a closed rectangular frame form, or that forms this frame form in several parts and is constructed for example from two halves. The elastic insert 7 is provided inside the support frame 6. The outer circumference of the elastic insert 7 corresponds roughly to the inner circumference of the support frame 6. One or more channels 13 are formed in the elastic insert 7 in order to distribute the coolant or refrigerant over the surface of the cooling plate 4. A meandering channel 13 is preferably provided, as shown in FIG. 2, which extends in meandering form from an input 14, which is connected to the associated coolant line 8, to an output 15. In other words, channel sections that run substantially in parallel are provided, the coolant having different flow directions in adjacent channel sections when coolant flows. The coolant lines 8 in the illustrated exemplary embodiment are arranged underneath each energy storage cell 2, but may also be arranged on the shorter sides of the support frame 6.

If the energy store 1 contains a cooling system for normal operational cooling, the emergency cooling device may then be integrated into this cooling system and have a dedicated coolant and a dedicated pipe system.

As an alternative, the coolant and the pipe system of the normal energy store cooling system may be jointly used for the emergency cooling device. In this case, the coolant lines 8 are directly fitted to the existing energy store cooling system.

Figure 3:
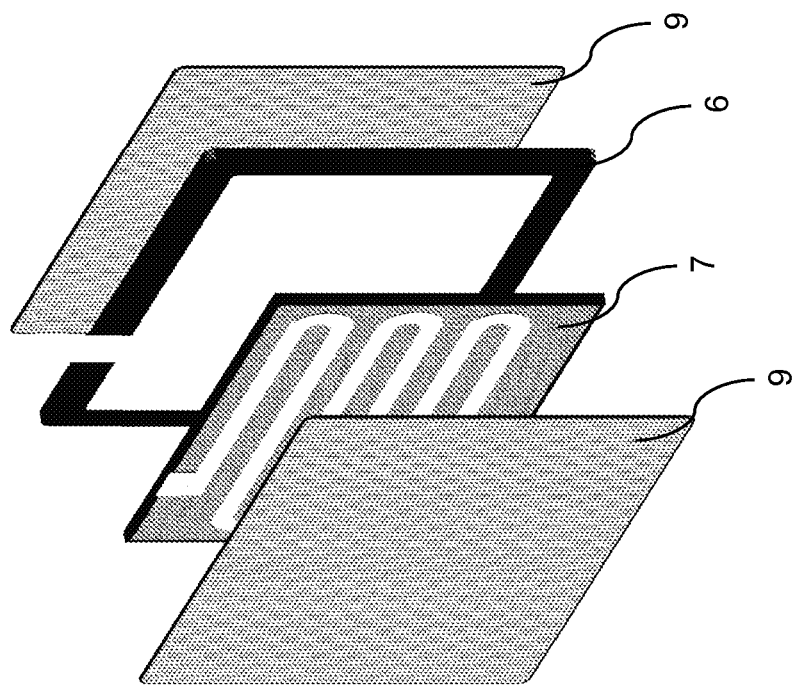
FIG. 3 is an exploded illustration of the structure of the cooling plate of the energy store.

FIG. 3 shows an exploded illustration of the structure of a cooling plate 4. The energy storage cells 2 are separated from one another by the support frame 6 such that a cavity is formed between them that prevents the cells from being able to touch one another. The support frame 6 consists of refractory and heat-resistant material, preferably of thermoset materials (for example diallyl phthalate resins, epoxy resins, urea formaldehyde resins, melamine formaldehyde resins, melamine phenol formaldehyde resins, phenol formaldehyde resins and/or unsaturated polyester resins). To increase strength, thermoset materials may be reinforced with glass fibers and/or whiskers, wherein the ratio of reinforcing material to polymer matrix should preferably lie in a range from 10:90 to 65:35. As an alternative, carbonates and/or silicates may be used as fillers for reinforcement purposes.

For the structure of the support frame, in particular as a composite of a plurality of materials, reinforced thermosets (as described above), mica, polytetrafluoroethylene, silicone resins and perfluoroalkoxy polymers with the base unit poly[tetrafluoroethylene-co-perfluoro (alkyl vinyl ether)] and/or high-temperature-resistant polyimides based on pyrazinetetracarboxylic anhydride and 1,3,4-thiazole-2,5-diamine are furthermore suitable. Refractory foamed ceramics based on finely ground silicates or chemically produced oxides, for example clays, kaolins and/or alumina having a porosity of between 30 and 70% and reduced thermal conductivity $<1$ $W \cdot m^{-1} \cdot K^{-1}$ are also suitable.

The support frame 6 consists of one or more layers (sandwich structure), each layer being formed from one or more of the abovementioned materials. The support frame 6 may thus be designed such that it embraces or encloses the contacting energy storage cell 2 on at least one of its two sides and thus additionally stabilizes the structure of the energy storage module. At least one of the energy storage cells 2 adjacent to the cooling plate 4 may be provided with an electrical insulation layer on the side facing the cooling plate 4. At least one opening on the support frame 6 may be equipped with a valve in order to control the gas pressure in the cavity between the energy storage cells 2. As a result of this, the residence time and the aggregate state of the coolant in the support frame 6 is able to be controlled.

The elastic insert 7 arranged inside the support frame 6 serves to thermally and electrically insulate the energy storage cells 2 from one another, to distribute the coolant over the surface of the cooling plates 4 and to control its residence time. The elastic insert 7 consists for example of a compressible, preferably foamed, refractory material having a specific channel structure in order to better distribute the coolant between the cells. At the same time, the elastic insert 7 serves to apply a counterpressure to the energy storage cells 2 during ageing of the store and the bulging of the energy storage cells that is possibly associated therewith. In the event of strong heating (thermal event), the elastic insert 7 may lose its compressibility or have it reduced and thus stiffen in the process, so that the channel structure remains guaranteed and exerts an even greater counterpressure against bulging caused by the thermal event. At the same time, it may become a thermal insulator.

The combination of support frame 6 and elastic insert 7 is provided on both sides with the electrically insulating film 9.

Figure 4:
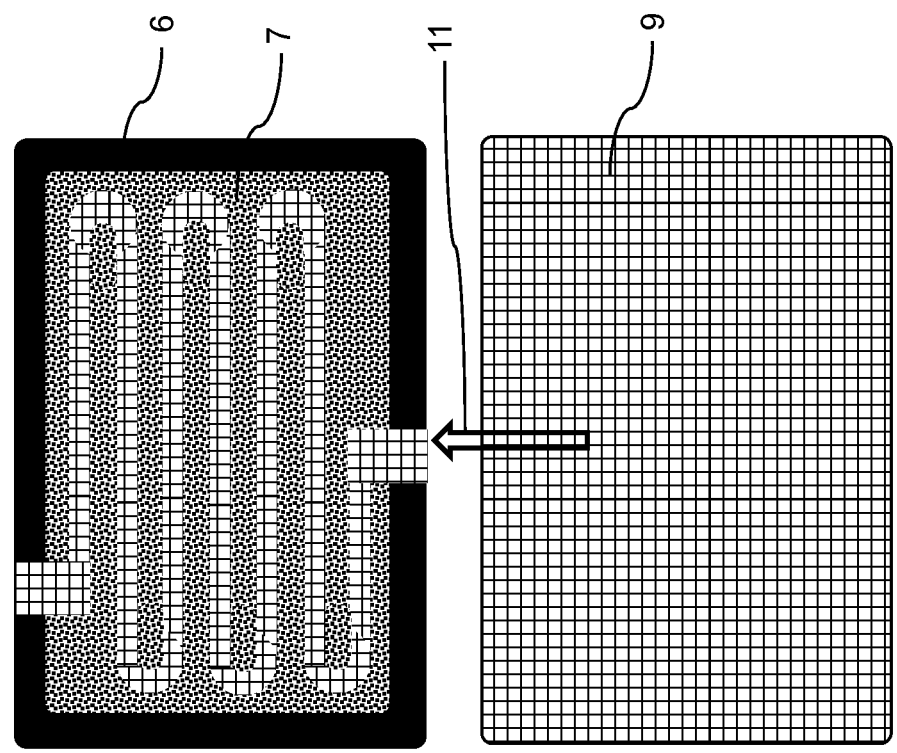
FIG. 4 shows a sequence of the method for manufacturing the cooling plate.
Figure 4:
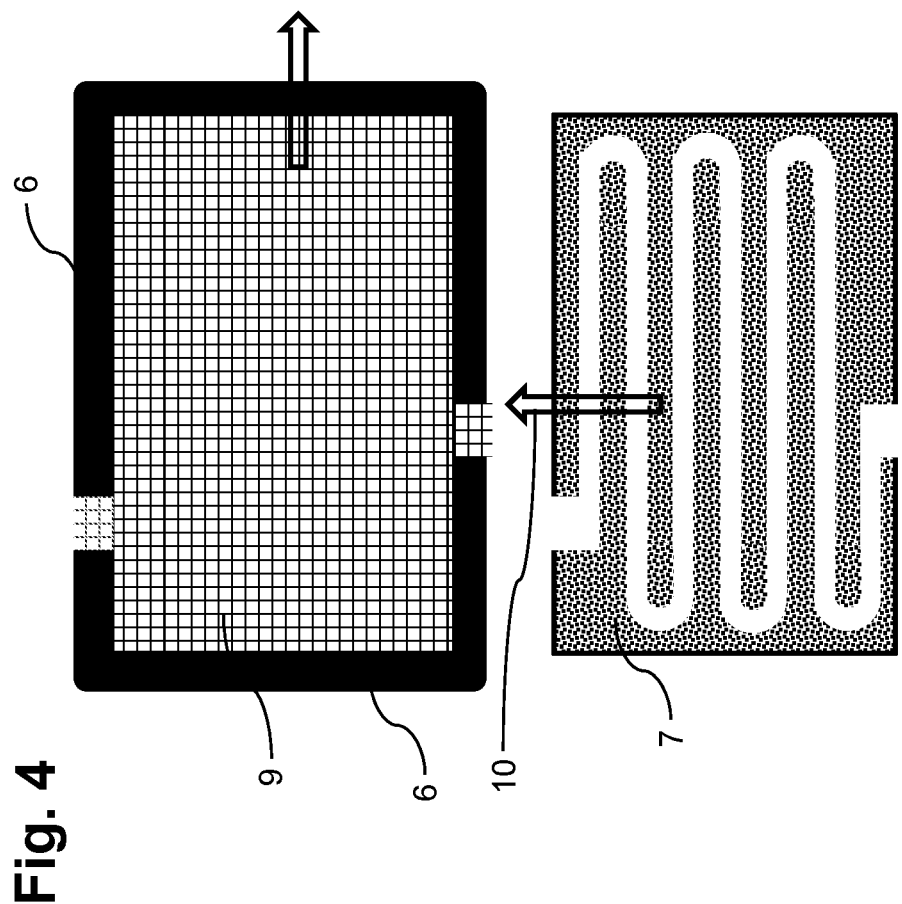

FIG. 4 shows a sequence of the method for manufacturing the cooling plates 4. First of all, the support frame 6 and an electrically insulating film 9 are adhesively bonded to one another (see top left of FIG. 4). The electrically insulating film 9 could be adhesive on both sides, but at least the side facing the support frame 6 is adhesive. The elastic insert 7 (see bottom left of FIG. 4) is then inserted into the support frame 6, as indicated by the arrow 10. As a result of this, the elastic insert 7 is likewise adhesively bonded to the film 9. This unit consisting of support frame 6, elastic insert 7 and a single film 9 (see top right of FIG. 4) is then adhesively bonded to a second electrically insulating film 9 (see bottom right of FIG. 4), as indicated by the arrow 11.

Figure 5:
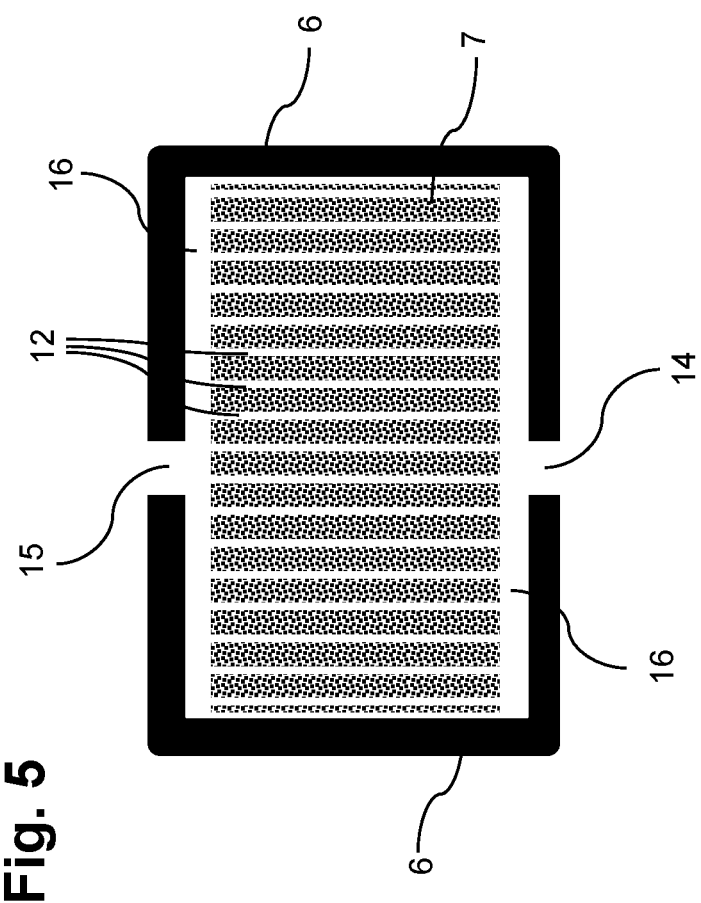
FIG. 5 shows a cooling plate with another channel structure in which cooling channels run parallel to one another.

FIG. 5 shows another channel structure in which a plurality of channels 12 are formed that extend parallel to one another from one side of the input 14 of the support frame 6 to one side of the output 15 of the support frame 6. The channels 12 running parallel to one another are connected to one another by way of transverse channels 16, one transverse channel 16 of which is connected to the input 14 and one transverse channel 16 of which is connected to the output 15.

FIGS. 2 to 5 show a channel structure in which the channel structure passes completely through the elastic insert 7 in a thickness direction of the elastic insert 7 (that is to say perpendicular to the plane of the page in FIG. 2 or perpendicular to the plane spanned by the elastic insert 7), such that the channel structure is exposed on the side faces that face the adjacent energy storage cells 2. In this configuration, the channel structure or the channel 13 or the channels 12, 16 is therefore laterally sealed off on both sides by the adhesively bonded film 9.

Figure 6:
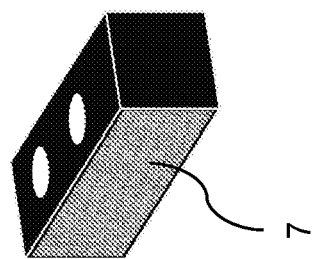
FIG. 6 shows another structure of an elastic insert of the cooling plate.

FIG. 6 shows another exemplary embodiment in which the channel structure does not pass through the elastic insert, as described in the last paragraph, but rather is formed inside the elastic insert such that the elastic insert 7 is closed off completely on the two side faces that face the adjacent energy storage cells 2.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An energy store, comprising:
    a plurality of electrical energy storage cells electrically connected in series or in parallel and combined to form an energy storage module;
    cooling plates arranged between the plurality of electrical energy storage cells, wherein
        a coolant or refrigerant is introducible into the cooling plates,
        each cooling plate has a support frame surrounding an elastic insert,
        the elastic insert forms a channel structure that routes the coolant or the refrigerant through the elastic insert, and
        the channel structure passes completely through the elastic insert in a thickness direction of the elastic insert, such that the channel structure is exposed on side faces facing adjacent energy storage cells.

2. The energy store as claimed in claim 1, wherein an electrically insulating film is arranged between the elastic insert, including the support frame, and the energy storage cells adjoining the cooling plate.

3. The energy store as claimed in claim 1, wherein an elasticity of the elastic insert decreases as temperature rises above 130° C.

4. The energy store as claimed in claim 1, wherein an elasticity of the elastic insert decreases as temperature rises above 150° C.

5. The energy store as claimed in claim 1, wherein the support frame is made of a thermoset polymer, mica, polytetrafluoroethylene, silicone resin, perfluoroalkoxy polymer, polyimide, refractory foamed ceramic, or a combination of a plurality of these materials.

6. The energy store as claimed in claim 1, wherein the channel structure formed in the elastic insert is closed off completely by an electrically insulating film on a side face that faces adjacent energy storage cells.

7. The energy store as claimed in claim 1, wherein the channel structure has a meandering channel form that extends from an input to an output of the cooling plate.

8. The energy store as claimed in claim 1, wherein the channel structure comprises a plurality of channels that extend parallel to one another.

9. A method for manufacturing an energy store, the method comprising the acts of:
    adhesively bonding a first electrically insulating film to one side of a support frame of a cooling plate;
    arranging an elastic insert inside the support frame, as a result of which the elastic insert is also adhesively bonded directly to the first electrically insulating film; and
    alternately stacking energy storage cells and cooling plates so as to form an energy storage module, wherein the elastic insert forms a channel structure that passes completely through the elastic insert in a thickness direction of the elastic insert, such that the channel structure is exposed on side faces facing adjacent energy storage cells.

10. The method as claimed in claim 9, further comprising the act of:
    attaching a second electrically insulating film between a side of the elastic insert that lies opposite the first electrically insulating film and the adjacent energy storage cell.

11. A motor vehicle, comprising an energy store as claimed in claim 1.

12. The energy store as claimed in claim 1, wherein the channel structure is continuous.

13. The energy store as claimed in claim 1, wherein an outer circumference of the elastic insert corresponds to an inner circumference of the support frame.

14. The energy store as claimed in claim 1, wherein the elastic insert is planar in shape.

15. The energy store as claimed in claim 1, wherein the elastic insert at least partially encloses the coolant or refrigerant within the channel structure.

* * * * *